United States Patent
Reiss et al.

(10) Patent No.: US 10,131,554 B2
(45) Date of Patent: Nov. 20, 2018

(54) MOBILE WATER CART WITH WATER PRE-CONDITIONING DEVICE

(71) Applicant: Airbus Operations GmbH, Hamburg (DE)

(72) Inventors: Matthias Reiss, Hamburg (DE); Sebastian Flashaar, Hamburg (DE); Ole Becker, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 321 days.

(21) Appl. No.: 14/798,772

(22) Filed: Jul. 14, 2015

(65) Prior Publication Data

US 2016/0016827 A1    Jan. 21, 2016

(30) Foreign Application Priority Data

Jul. 16, 2014 (EP) .................................. 14177299

(51) Int. Cl.
*C02F 1/46* (2006.01)
*B60P 3/22* (2006.01)
*C02F 5/08* (2006.01)

(52) U.S. Cl.
CPC ............ *C02F 1/4602* (2013.01); *B60P 3/224* (2013.01); *B01D 2311/12* (2013.01);
(Continued)

(58) Field of Classification Search
CPC ............ B01D 2311/10; B01D 2311/12; B01D 2311/2603; B01D 2311/268; B01D 61/58;
(Continued)

(56) References Cited

U.S. PATENT DOCUMENTS

| 4,671,863 A | * | 6/1987 | Tejeda | B01D 61/46 204/266 |
| 2005/0103622 A1 | * | 5/2005 | Jha | C02F 1/469 204/237 |

(Continued)

FOREIGN PATENT DOCUMENTS

CN     2454373 Y    10/2001
CN   203108857 U     8/2013
(Continued)

OTHER PUBLICATIONS

English language machine translation of CN2454373, 11 pages, No Date.*

(Continued)

*Primary Examiner* — Pranav N Patel
(74) *Attorney, Agent, or Firm* — Lorenz & Kopf LLP

(57) ABSTRACT

Water supply vehicle comprising a water reservoir, a flow through descaling device having a water inlet, a water outlet, a detecting device for detecting a water characteristic in a water flow from the water inlet to the water outlet, a controllable water descaling device, and a controlling device being designed for controlling the water descaling device based on a water characteristic detected by the detection device, wherein the water reservoir is connected to the water inlet, wherein the water outlet is connectable to a water hose for supplying water to a water consumer.

15 Claims, 1 Drawing Sheet

(52) U.S. Cl.
CPC .............. *C02F 2201/4612* (2013.01); *C02F 2201/46105* (2013.01); *C02F 2209/003* (2013.01); *C02F 2303/22* (2013.01)

(58) Field of Classification Search
CPC ........ B01D 61/22; B01D 61/44; B01D 61/54; C02F 1/42; C02F 1/469; C02F 1/4695; C02F 9/005; C02F 2201/001; C02F 2201/008; C02F 2201/46135; C02F 2209/005; C02F 2209/006; C02F 2209/02; C02F 2209/05; C02F 2303/22
See application file for complete search history.

(56) References Cited

U.S. PATENT DOCUMENTS

| | | | | |
|---|---|---|---|---|
| 2005/0139530 | A1* | 6/2005 | Heiss | C02F 9/00 210/85 |
| 2011/0290723 | A1* | 12/2011 | Bonnelye | B01D 61/12 210/636 |
| 2011/0315632 | A1* | 12/2011 | Freije, III | B01D 61/12 210/636 |
| 2013/0126430 | A1* | 5/2013 | Kenley | B01D 61/00 210/638 |
| 2013/0277222 | A1* | 10/2013 | Kwon | C02F 1/4691 204/555 |
| 2014/0094975 | A1* | 4/2014 | Nielsen | C02F 1/004 700/282 |

FOREIGN PATENT DOCUMENTS

| | | | |
|---|---|---|---|
| EP | 1046544 | A2 | 10/2000 |
| EP | 1338573 | A1 | 8/2003 |
| GB | 281056 | A | 12/1927 |
| WO | 2005087669 | A1 | 9/2005 |
| WO | WO2012037274 | * | 3/2012 |
| WO | WO2013116035 | * | 8/2013 |

OTHER PUBLICATIONS

European Patent Office, European Search Report for European Patent Application No. 14177299.6 dated Sep. 29, 2014.

* cited by examiner

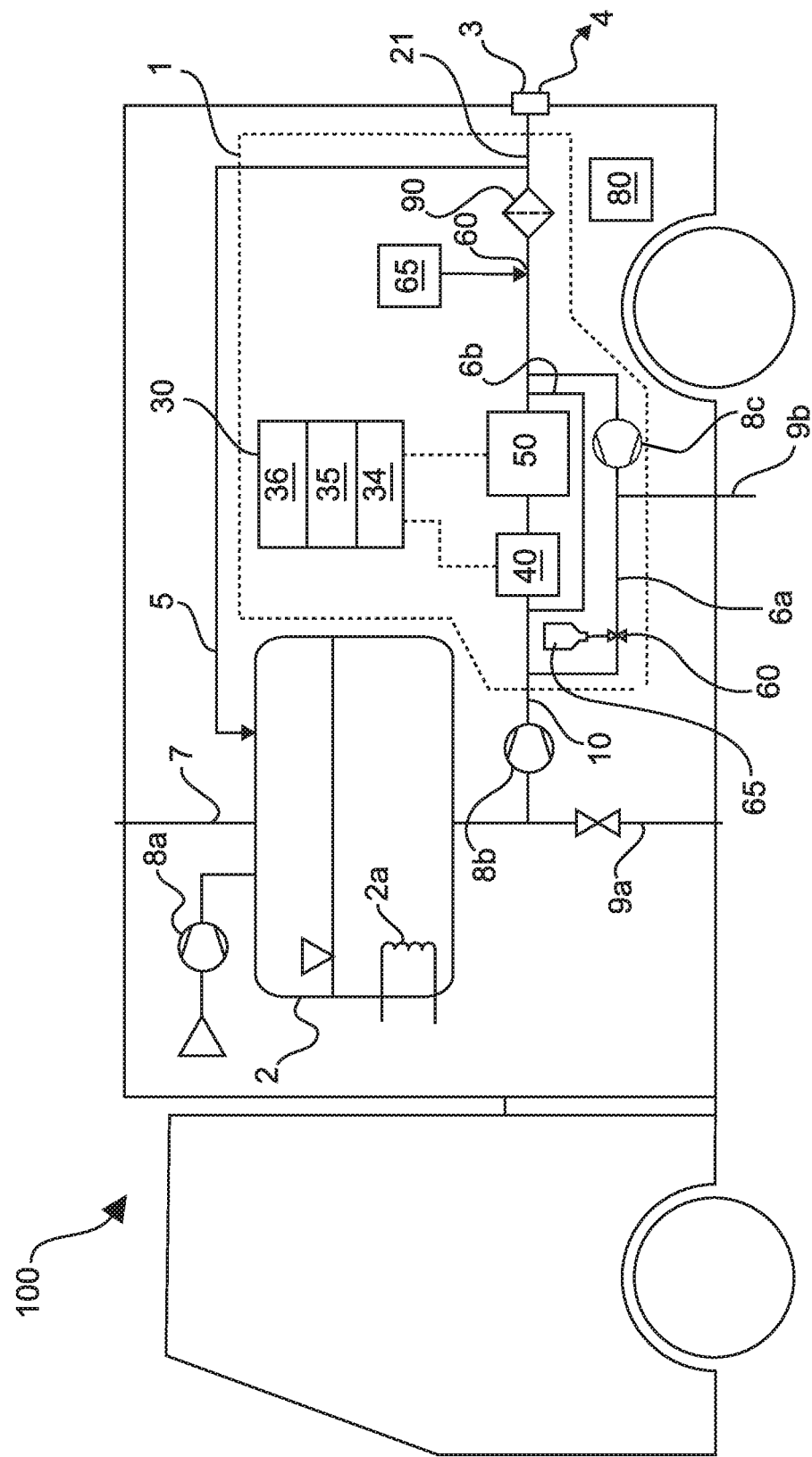

MOBILE WATER CART WITH WATER PRE-CONDITIONING DEVICE

CROSS-REFERENCE TO RELATED APPLICATIONS

This application claims priority to European Patent Application No. EP 14 177 299.6 filed 16 Jul. 2014, which is incorporated herein by reference in its entirety.

TECHNICAL FIELD

The embodiment relates to a mobile water cart, and in particular relates to a mobile water cart with a water pre-conditioning device for lime descaling in further use of the water.

BACKGROUND

Many failures of equipment of a water system are due to lime scale build-up, in particular when the equipment has a heating function. In particular for a vehicle or mobile applications, water systems of a vehicle also suffer from a lime scale build-up. A water system of a vehicle, in particular of an aircraft, may for example have coffee makers, water heaters in a galley or heated valves, heating units as steam ovens, which are subject to degradation due to a lime scale buildup. The resulting maintenance activities are time and labor intensive, and therefore involve high operating costs at the airline side. The provision of water, in particular high quantities of water, when servicing vehicles, in particular aircrafts, may be a challenge, if the water needs to be pre-conditioned. Typically, the potable water on board of an aircraft is filled up by the use of potable water trucks, while the aircraft is on ground. The water is usually stored within a tank on the potable water truck or water cart and may be pumped from the water cart through connecting hoses to the potable water filling interface of the aircraft.

In addition, other objects, desirable features and characteristics will become apparent from the subsequent summary and detailed description, and the appended claims, taken in conjunction with the accompanying drawings and this background.

SUMMARY

It would be desirable to provide an improved mobile water cart, in particular a mobile water cart with water pre-conditioning.

This object is achieved by the subject-matter of the independent claim. Further exemplary embodiments are evident from the dependent claims and the following description.

According to an embodiment, a water supply vehicle comprising a water reservoir, a flow through descaling device having a water inlet, a water outlet, a detecting device for detecting a water characteristic in a water flow from the water inlet to the water outlet, a controllable water descaling device, and a controlling device being designed for controlling the water descaling device based on a water characteristic detected by the detection device, wherein the water reservoir is connected to the water inlet and wherein the water outlet is connectable to a water hose for supplying water to a water consumer.

Thus, a water supply vehicle may be provided that allows a pre-treatment of the water when the water is supplied to a water consumer. The water consumer may for example be an aircraft. When supplying water to the aircraft during ground service, water from the water reservoir is supplied to the aircraft. However, before arriving at the aircraft the water passes a flow through descaling device, so that the water may be descaled or decalcified. Thus, a lime scale buildup may be reduced or suppressed, so that lime scale related damages in the aircraft may be avoided. A detecting device may be used for detecting water characteristics in the water flow, so that the water descaling device may be properly controlled to arrive at an efficient descaling of water. In particular, the flow through of water may be adapted to the descaling capacity of the flow through descaling device. In particular, the flow through of the water may be increased when detecting a low water hardness, and the flow through of the water may be decreased when detecting a high water hardness, so that an optimal adaption of the descaling result and the maximum flow may be achieved.

According to an embodiment, the water reservoir of the water cart comprises a heater.

Thus water freezing in the water supply vehicle and may consequently damaging the water supply vehicle may be avoided. Further, the descaling may be improved when receiving heated water.

According to an embodiment, the water supply vehicle comprises a pump, which pump is arranged so as to force a water flow from the reservoir through the flow through descaling device to the water outlet.

Thus, the quantity of water may be controlled. The pump may be arranged as a flow through water pump, so that the pump is connected in line of the water flow. Additionally or alternatively, a pump may be provided as an air pump to pressurize the water reservoir, so that an overpressure in the water reservoir forces the water through the pipes of the water pipe system of the water supply vehicle. The pump may be a compressor.

According to an embodiment, the water descaling device is an electrolytic descaling device or an alternative technology.

Thus, a proper controlling of the water descaling device may be carried out by a controlling device. The electrolytic treatment module may be integrated in the vehicle, such that it is easily exchangeable. This simplifies the regeneration or replacement of such a module. As an alternative, the descaling device may be a filtration device, and/or an osmosis device, and/or an ion exchange device. An electrolytic water treatment device is based on the application of a voltage to electrolytic water treatment module so as to generate microcrystals. Therefore, any lime scale that occurs accumulates on the micro-crystals instead of any heat elements. These micro-crystals may be flushed out of the water system. Such an electrolytic water treatment system is known, for example from WO 2005/087669 A1, which describes a system for stationary application.

According to an embodiment, the water system vehicle further comprises a dosage unit having an additive reservoir and a controllable feeding device, wherein the controllable feeding device is adapted to control a feeding of an additive from the additive reservoir between the water descaling device and the water outlet.

Thus, it is possible to feed inhibitors or phosphates to the water in order to suppress lime scale buildup in the water system. As an alternative, the additive reservoir may provide an acid as an additive to prevent lime scale buildup. It should be noted that the water supply vehicle may also be used as a disinfection device for the aircraft, when providing disinfection liquid. Such disinfection liquid may be mixed by providing water out of the reservoir and by mixing the water with the additive out of the additive reservoir.

According to an embodiment, the water supply vehicle further comprises a service panel being adapted for indicating of needed parameters and a parameter adjustment possibility.

Thus, it is possible to provide an interface for a user to receive information of the conditions of the water supply vehicle and the water descaling process therein, and at the same time to provide an operating interface to operate the water supply vehicle.

According to an embodiment, the detecting device for detecting a water characteristic is adapted to detect at least one characteristic out of a group of parameters, the group consisting of water hardness, water conductivity, pH-value, water temperature, and water flow.

Thus, the water supply vehicle and the flow through descaling device therein may adapt the descaling process to the water conditions based on the main characteristics of the water. It should be noted that the controlling may be carried out based on one or more of the above-mentioned water characteristics.

According to an embodiment, the water supply vehicle comprises a filter for filtering residuals from the water, wherein the filter is arranged between the water descaling device and the water outlet.

Thus, it is possible to filter particles before feeding the water to the consumer, in particular an aircraft. In particular when the descaling process results in a build-up of larger particles, a filter may remove such particles before such particles arrive at sensitive components of an aircraft.

According to an embodiment, the water supply vehicle further comprises a bypass line for bypassing the water descaling device, wherein the bypass line branches before the water descaling device and ends between the water descaling device and the water outlet.

Thus, it is possible to bypass the water descaling device, for example if the water descaling device is broken or is exhausted and requires a regeneration cycle.

According to an embodiment, the water supply vehicle comprises a circulation/regeneration line, wherein the circulation/regeneration line connects a branch behind the water descaling device and a branch before the water descaling device.

Thus, it is possible to provide a regeneration circuit including the circulation/regeneration line and the water descaling device, so that a regeneration process may be carried out for the water descaling device. It should be noted that also the detecting device may be included in the regeneration circuit.

According to an embodiment, the circulation/regeneration line comprises a circulation pump and/or a drain.

Thus, a circulation pump may generate a circular flow and iterate flow through of a regeneration fluid through the water descaling device.

According to an embodiment, the regeneration line comprises an additive reservoir and a feeding device.

Thus, it is possible to feed a regeneration liquid in the circulation/regeneration circuit. When feeding a regeneration liquid, it is possible to drain the regeneration liquid from the regeneration circuit. Thus, the regeneration liquid may be removed and a flush of the regeneration circuit may be carried out before the water descaling device is loaded with potable water again.

According to an embodiment, the water supply vehicle further comprises a recirculation line, wherein the recirculation line branches after the water descaling device and ends in the water reservoir for circulating water from the water reservoir to the water descaling device and back to the water reservoir.

Thus, it is possible to circulate the water from the reservoir and carry out a descaling when circulating, so that the reservoir may also contain water with a reduced lime scale buildup tendency. In particular when a water supply vehicle is not in service, the water in the reservoir may successively be descaled, so that a later feeding of water is accelerated, which may be of relevance when servicing aircrafts.

According to an embodiment, the controlling device comprises a voltage/current detection, wherein the controlling device is adapted to control the controlling voltage/controlling current of the water descaling device to be below a predetermined threshold value so as to avoid electrolysis of the water. Thus, electrolysis of water may be avoided.

According to an embodiment, the water descaling device is a lime descaling device.

It should be noted that the branches and pipes of the water supply system of the water supply vehicle may have valves, in particular check valves or controllable valves so as to establish particular circuits, even if those valves are not described in detail. In particular, certain valves may be in a state so as to avoid a back flow of water and to establish the bypass and the regeneration circuit as well as the recirculation of the water back into the reservoir.

BRIEF DESCRIPTION OF THE DRAWINGS

The various embodiments will hereinafter be described in conjunction with the following drawing figures, wherein like numeral denote like elements, and:

FIG. 1 illustrates a mobile water cart or water supply vehicle with a pre-conditioned device according to an exemplary embodiment.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

FIG. 1 illustrates a water supply vehicle 100, also denoted as a mobile water cart, 100, having a treatment module installed that reduces the ability of the water to build up lime scale, for example in an aircraft. A water cart is commonly used as ground support equipment (GSE), which ground support equipment may also operate as a mobile water treatment unit before the water is filled into the aircraft. The potable water may be stored in a tank or a reservoir 2, which may be insulated and electrically heated to avoid freezing. For this purpose, a heater 2a may be provided in the reservoir. It should be noted that additional heaters may also be provided along the pipes of the water system in the vehicle 100, even if not illustrated in detail. The tank and the other components filled with water may be drained. For this purpose, the components should be arranged such that the entire water may flow out of the drain opening to discharge the water from the tank when being pumped. Such a draining may be carried out through a drain line 9a.

The vehicle 100 may be provided with a pump for driving the water through the water pipes of the water system. As one option, it is possible to provide a water pump 8a to pressurize the water reservoir 2, so that the overpressure drives the water through the pipes. In addition or as an alternative, a pump 8b may be provided in line with the pipes so as to drive the water through the pipes. The pumps may be driven by a battery on the vehicle 100. The battery may be chargeable. In case the water is pumped out of the reservoir 2, in order to be filled into the aircraft as a consumer 4, the water flows into the water treatment module 1, which is the flow through descaling device 1. Thus, the water is descaled before entering the aircraft. The descaling may be carried out by an electrolytic water treatment, like electrolytic descaling, but in addition or alternatively by filtration, osmosis, ion exchange or any other water treatment method. When using an electrolytic water treatment, a voltage is applied to the water descaling device 50 that leads to a micro-crystal precipitation, which is contained in the water. Any lime scale that occurs will accumulate on the micro-crystals instead of any heat elements. These micro-crystals are flushed out of the water system. The reservoir 2 may have a ventilation/filling opening 7, so that the reservoir may be ventilated. Further, the opening 7 may also serve for filling the reservoir. It should be noted that the reservoir may also be filled through the draining lines 9a, or through the consumer terminal 3. When the water enters a flow descaling device 1 through the water inlet 10, the water passes a detecting device 40. The detecting device 40 may detect a water characteristic, like water hardness, a water flow rate, a pH value, a water temperature, or water conductivity. These water characteristics may serve as a basis for controlling the descaling process in the water descaling device 50. The controlling device 30 may receive the detected water characteristics from the detecting device 40 and calculate the correct driving parameters for the water descaling device 50 by a processor 34. The controlling device 30 may further include a data storage 35, which may have stored predetermined water characteristics, like for example water hardness, water conductivity, pH value, water flow rate, or water temperature. It should be noted that the controlling device 30 may consider both, the stored predetermined water characteristics as well as the detected water characteristics from the detecting device 40. For example, the controlling device 30 may conclude from the comparison of the detected and the stored values how to control the water descaling device 50 properly. The controlling device 30 may further have a voltage/current detection unit 36. This voltage/current detection unit 36 may be used for detecting the controlling voltage of the controlling device 30, so that the controlling device 30 may detect an overvoltage or overcurrent at the water descaling device 50. In particular, the electrical properties of the water descaling device 50 may change when the condition of the water descaling device 50 deteriorates. This may be detected by the voltage/current detection unit 36 of the controlling device 30, so that the controlling device 30 may inform the user about the need of maintenance of the flow through descaling device 1 or the water descaling device 50. When this is necessary, the treatment module may be exchanged by a new treatment module, which module may either be the water descaling device 50 or the entire flow through descaling device 1. As an indication, the controlling device 30 may give the information to the user, for how many remaining operation hours or how much remaining water volume, respectively, the unit may be used. This may be dependent on the water flow, measured at the outlet together with the temperature and the pH-value and the water hardness of the water provided at the airport, which may be set on the indication panel or service panel 80 of the vehicle 100. Thus, a very accurate forecast may be given based on the airport specific water quality, for example the water hardness and the water flow rate. Also the actual water parameters, such as flow, temperature, water hardness, and pH-value and the respective settings of the flow through descaling device 1 may be displayed on the service panel 80. It should be noted that the vehicle 100 may for example communicate with an external base so as to transfer the gained information on the water condition or the condition of the flow through descaling device 1.

The flow through descaling device 1 or the vehicle 100 may have an additive reservoir 65 and a controllable feeding device 60, which may be a solenoid valve. Due to the fact that the water descaling device 50 efficiency decreases with decreasing water hardness, there is an option to mix and feed a fluid, for example an acid, after the treatment, which acid acts as an additional descaling agent. This additive fluid may be stored in the additive reservoir 65 and may be mixed in a defined ratio to the water through the controllable feeding device 60. This additive reservoir 65 may also be used for disinfection purposes of the aircraft. The program parameters, for example fill with fluid, flush with water, may be set on the service panel 80 accordingly.

The controlling device 30 may also be adapted to detect overvoltage/overcurrent that may lead to electrolysis of the water in the pipe system. As electrolysis of the water may lead to a generation of hydrogen gas and oxygen gas in the pipes, this may be a risk for the operation under safety aspects. Thus, the controlling device 30 may be adapted to control the driving voltage/driving current of the water descaling device 50 to be within a range so as to avoid electrolysis of the water.

The flow through descaling device 1 may have a bypass line 6b, so that water may bypass the detecting device 40 and the water descaling device 50. Particular valves may be provided, so as to avoid passing of the water through the detecting device 40 and the water descaling device 50 accordingly.

Further, the flow through descaling device 1 may have a circulation/regeneration line 6a. The regeneration line may be used to establish a circuit flow of a fluid through the circulation/regeneration line 6a and the water descaling device 50, optionally also the detecting device 40. Thus, a regeneration process may be carried out without the need for removing the components from the vehicle 100. It should be noted that a regeneration circuit of the regeneration line 6a and the water descaling device 50 may have a circulation pump 8c and an additional additive reservoir 65 with a controllable feeding device 60, so as to feed a regeneration liquid to the regeneration line. It should be noted that the flow through the regeneration circuit may be in both directions, forward or backward through the water descaling device 50. It should be noted that particular valves may be provided to avoid a flow of a regeneration liquid back to the reservoir or to other branches of the pipe system. According to an embodiment, the water supply vehicle further comprises a recirculation line 5, wherein the recirculation line 5 branches after the water descaling device 50 and ends in the water reservoir 2 for circulating water from the water reservoir 2 to the water descaling device 50 and back to the water reservoir 2. Moreover, according to an embodiment, the water supply vehicle comprises a filter 90 for filtering residuals from the water, wherein the filter 90 is arranged between the water descaling device 50 and a water outlet 21.

Thus, a vehicle may be provided that allows to descale water in situ during the process of filling water to the aircraft. This leads to a significant operational cost reduction of an airline, as the maintenance hours may be reduced and the performance of the vehicle 100 is larger, and as less spare parts are necessary.

It should be noted that the term "comprising" does not exclude other elements or steps, and the indefinite article "a" or "an" does not exclude a plurality. Also elements described in association with the different embodiments may be combined.

It should be noted that reference signs in the claims shall not be construed as limiting the scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A water supply vehicle comprising:
   a water reservoir,
   a flow through descaling device having a water inlet, a water outlet, a detecting device for detecting a water characteristic in a water flow from the water inlet to the water outlet, a controllable water descaling device, and a controlling device being designed for controlling the water descaling device based on a water characteristic detected by the detecting device, and
   a regeneration line,
   wherein the water reservoir is connected to the water inlet,
   wherein the water outlet is connectable to a water hose for supplying water to a water consumer,
   wherein the controlling device comprises a data storage element configured to store predetermined water characteristics,
   wherein the controlling device is configured to control the water descaling device based on a comparison of the detected water characteristic and the stored values of predetermined water characteristics,
   wherein the regeneration line connects a branch downstream of the water descaling device and connects a branch upstream of the water descaling device,
   wherein the regeneration line comprises a circulation pump for generating a circular flow and iterate flow of a regeneration fluid through the water descaling device,
   wherein the water supply vehicle further comprises an additive reservoir and a first controllable feeding device for the additive reservoir, wherein the first controllable feeding device is adapted to control a feeding of an additive from the additive reservoir between the water descaling device and the water outlet,
   wherein the regeneration line comprises an additional additive reservoir and a second controllable feeding device for the additional additive reservoir, to feed a regeneration liquid to the regeneration line, and
   wherein a bypass line for bypassing the water descaling device connects a first branch upstream of the water descaling device, connects a second branch downstream of the water descaling device and upstream of the additive reservoir, and is arranged parallel to the regeneration line such that upstream ends of the bypass and regeneration lines are coupled together and such that downstream ends of the bypass and regeneration lines are coupled together.

2. The water supply vehicle according to claim 1, wherein the water reservoir comprises a heater.

3. The water supply vehicle according to claim 1, wherein the water supply vehicle comprises an additional pump arranged so as to force a water flow from the reservoir through the flow through descaling device to the water outlet.

4. The water supply vehicle according to claim 1, wherein the water descaling device is an electrolytic descaling device.

5. The water supply vehicle according to claim 1, further comprising a service panel being adapted for indicating of needed parameters and a parameter input or adjustment possibility.

6. The water supply vehicle according to claim 1, wherein the detecting device for detecting a water characteristic is adapted to detect at least one characteristic out of a group, the group consisting of:
   water hardness,
   water conductivity,
   pH-value,
   water temperature, and
   water flow.

7. The water supply vehicle according to claim 1, further comprising a filter for filtering residuals from the water, wherein the filter is arranged between the water descaling device and the water outlet.

8. The water supply vehicle according to claim 1, further comprising a recirculation line, wherein the recirculation line branches after the water descaling device and ends in the water reservoir for circulating water from the water reservoir to the water descaling device and back to the water reservoir.

9. The water supply vehicle according to claim 1, wherein the controlling device comprises a voltage/current detection, wherein the controlling device is adapted to control the controlling voltage/current of the water descaling device to be below a predetermined threshold value so as to avoid electrolysis of the water.

10. The water supply vehicle according to claim 1, wherein the water descaling device is a lime descaling device.

11. A water supply vehicle comprising:
    a water reservoir,
    a flow through descaling device having a water inlet, a water outlet, a detecting device for detecting a water characteristic in a water flow from the water inlet to the water outlet, a controllable water descaling device, and a controlling device being designed for controlling the water descaling device based on a water characteristic detected by the detecting device, and
    a regeneration line,
    wherein the water reservoir is connected to the water inlet,
    wherein the water outlet is connectable to a water hose for supplying water to a water consumer,
    wherein the controlling device comprises a data storage element configured to store predetermined water characteristics;
    wherein the controlling device is configured to control the water descaling device based on a comparison of the detected water characteristic and the stored values of predetermined water characteristics,
    wherein the regeneration line connects a branch downstream of the water descaling device and connects a branch upstream of the water descaling device,
    wherein the regeneration line comprises a circulation pump for generating a circular flow and iterate flow of a regeneration fluid through the water descaling device, wherein the water reservoir comprises a heater, wherein the water supply vehicle further comprises an additive reservoir and a first controllable feeding device for the additive reservoir, wherein the first controllable feeding device is adapted to control a feeding of an additive from the additive reservoir between the water descaling device and the water outlet, wherein the regeneration line comprises an additional additive reservoir and a second controllable feeding device for the additional additive reservoir, to feed a regeneration liquid to the regeneration line, and wherein a bypass line for bypassing the water descaling device connects a first branch upstream of the water descaling device, connects a second branch downstream of the water descaling device and upstream of the additive reservoir, and is arranged parallel to the regeneration line such that upstream ends of the bypass and regeneration lines are coupled together and such that downstream ends of the bypass and regeneration lines are coupled together.

12. The water supply vehicle according to claim 11, wherein the water supply vehicle comprises a pump arranged so as to force a water flow from the reservoir through the flow through descaling device to the water outlet.

13. The water supply vehicle according to claim 11, further comprising:
a filter for filtering residuals from the water, wherein the filter is arranged between the water descaling device and the water outlet.

14. The water supply vehicle according to claim 13, further comprising a recirculation line, wherein the recirculation line branches after the water descaling device and ends in the water reservoir for circulating water from the water reservoir to the water descaling device and back to the water reservoir.

15. The water supply vehicle according to claim 14, wherein the controlling device comprises a voltage/current detection, wherein the controlling device is adapted to control the controlling voltage/current of the water descaling device to be below a predetermined threshold value so as to avoid electrolysis of the water.

* * * * *